Figure 22:
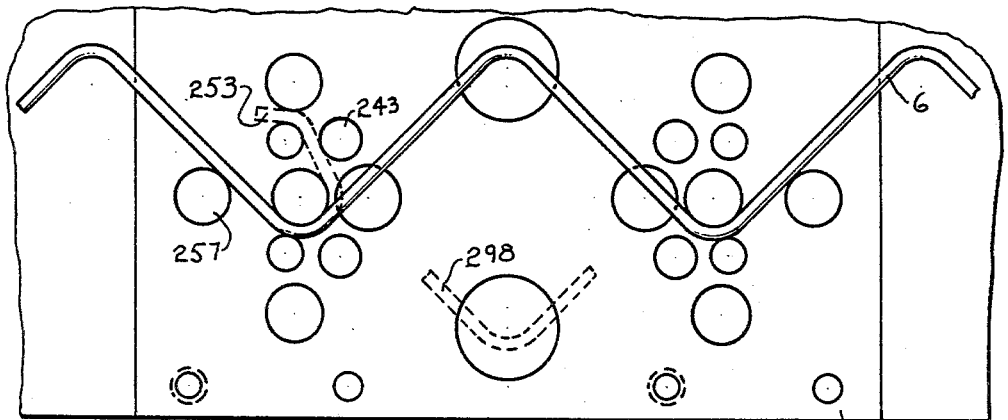

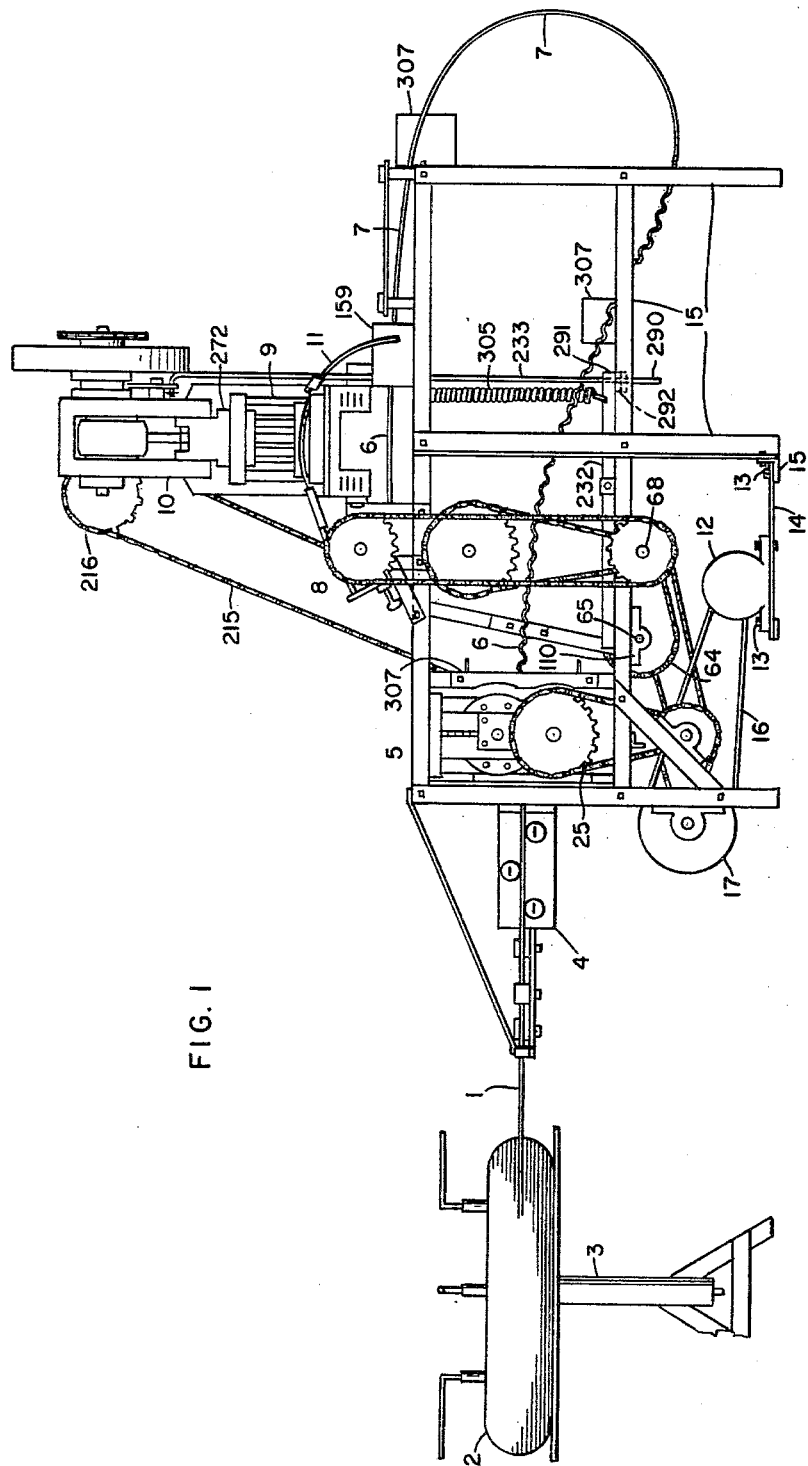
FIG. I
INVENTOR
John Wesley Hughes

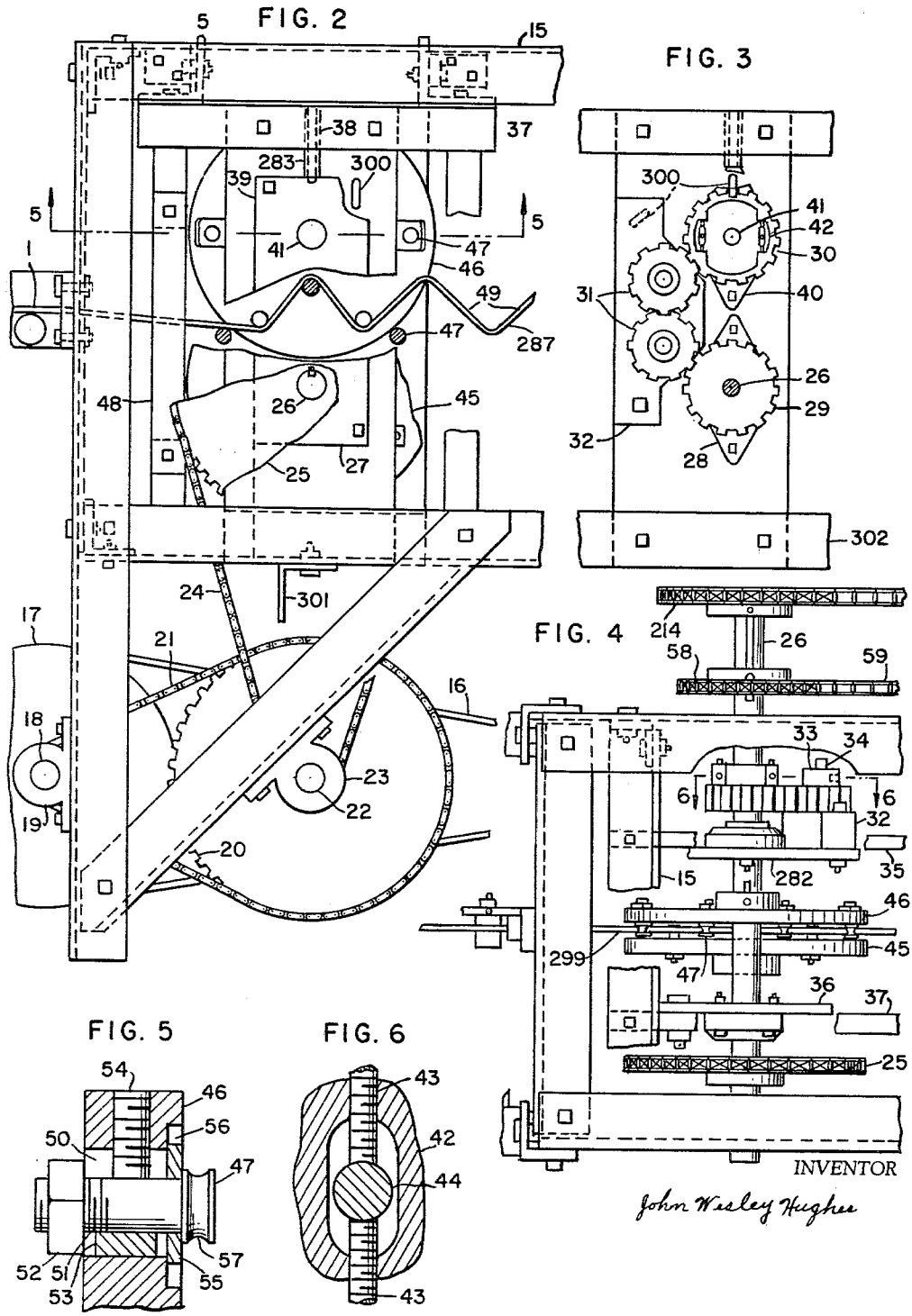

April 27, 1965 J. W. HUGHES 3,180,371
ZIG-ZAG SPRING MACHINE
Filed March 12, 1962 10 Sheets-Sheet 3
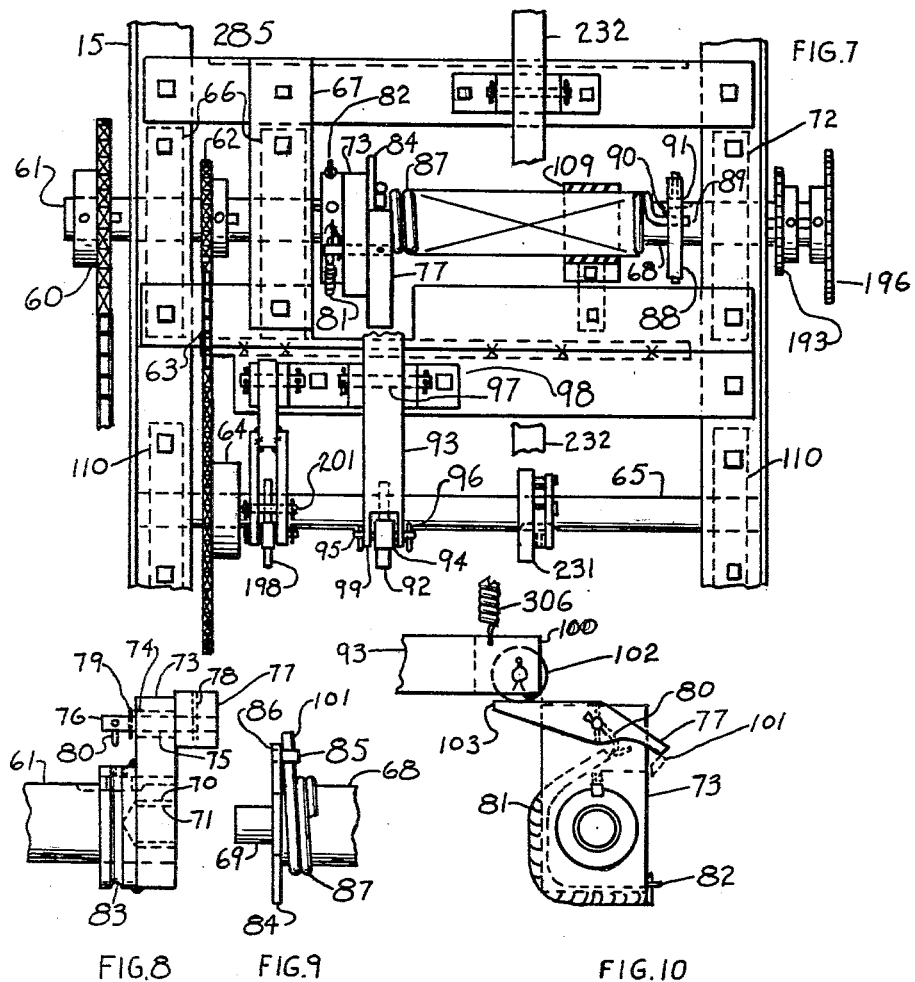
FIG.7
FIG.8  FIG.9  FIG.10
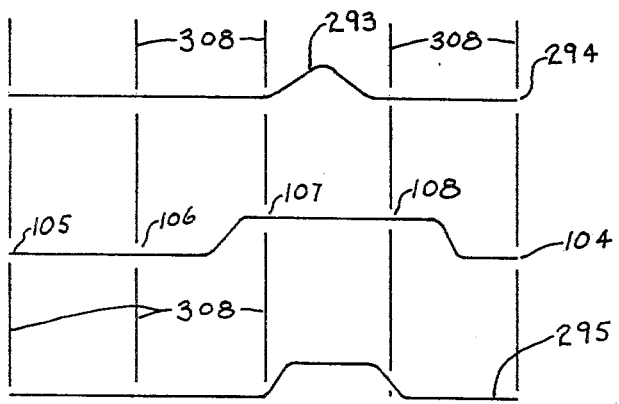
FIG.11
John Wesley Hughes
INVENTOR

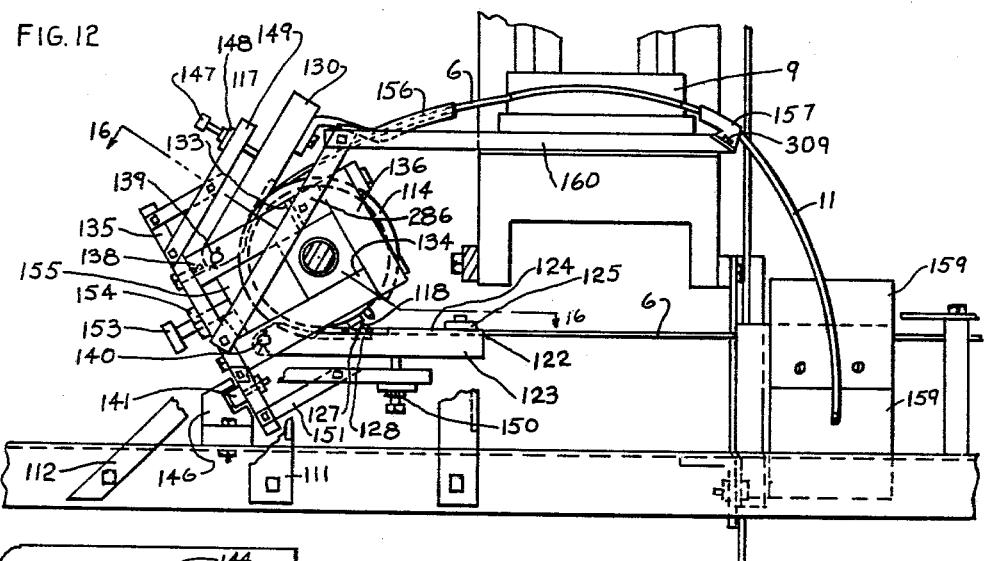
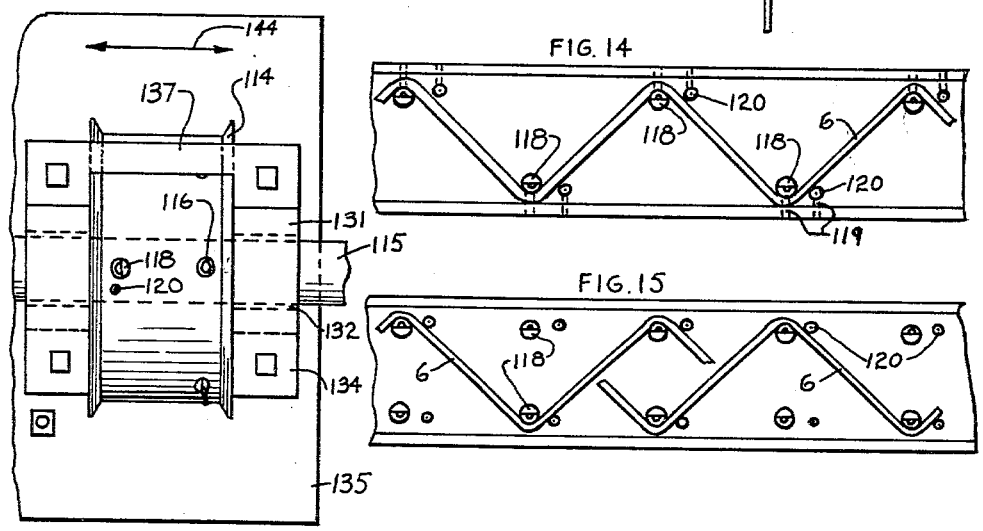
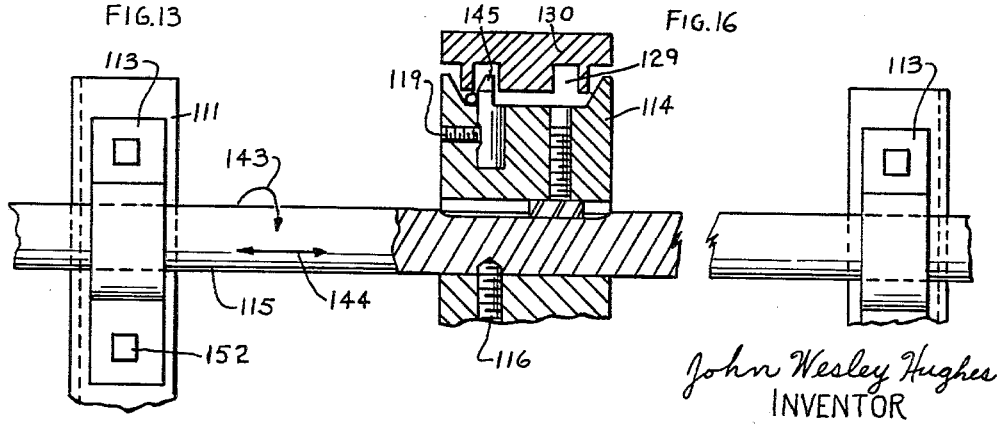

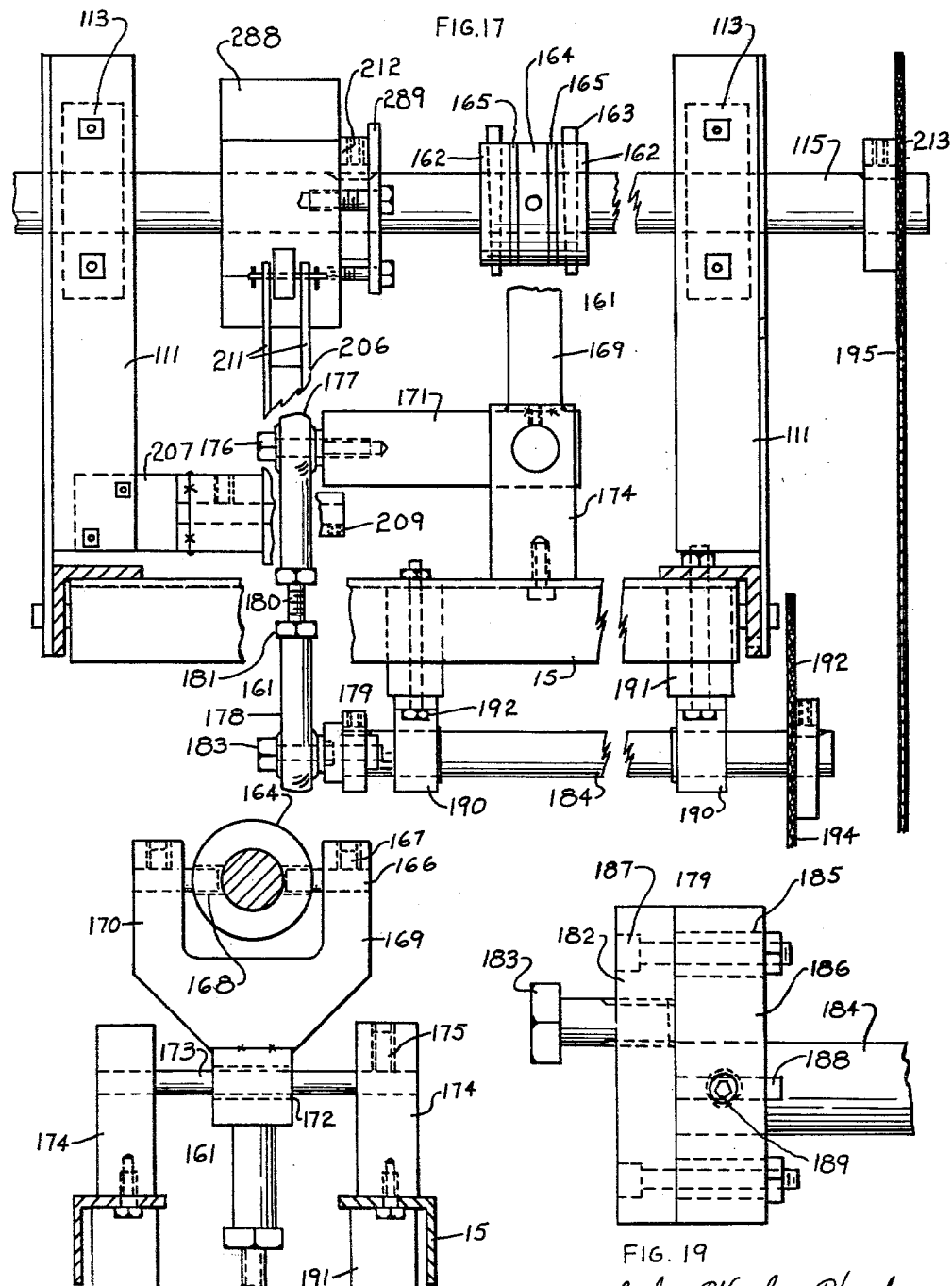

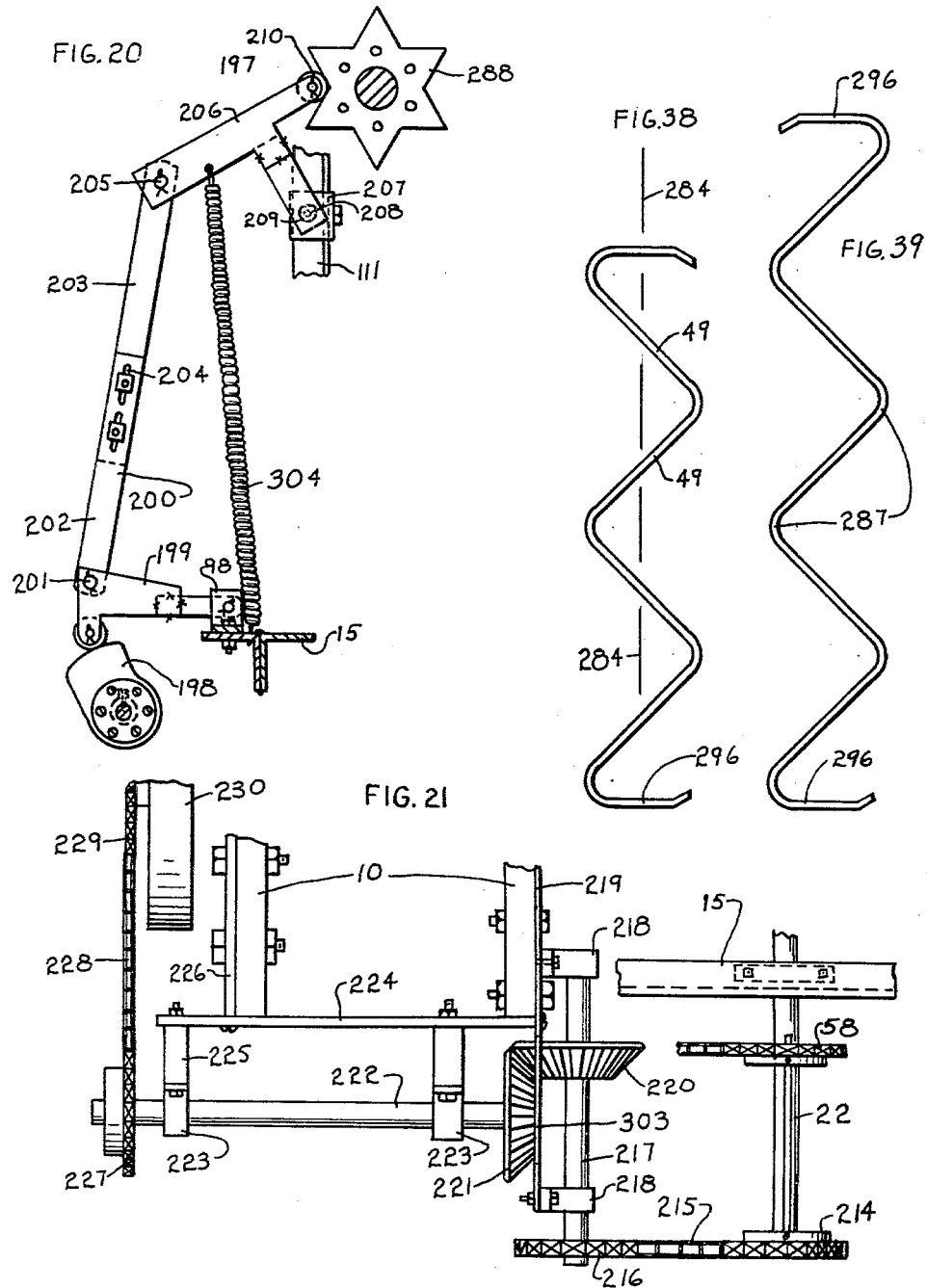

April 27, 1965     J. W. HUGHES     3,180,371
ZIG-ZAG SPRING MACHINE
Filed March 12, 1962     10 Sheets-Sheet 8

*John Wesley Hughes*
INVENTOR

April 27, 1965   J. W. HUGHES   3,180,371
ZIG-ZAG SPRING MACHINE
Filed March 12, 1962   10 Sheets-Sheet 9

John Wesley Hughes
INVENTOR

April 27, 1965          J. W. HUGHES          3,180,371
ZIG-ZAG SPRING MACHINE
Filed March 12, 1962          10 Sheets-Sheet 10
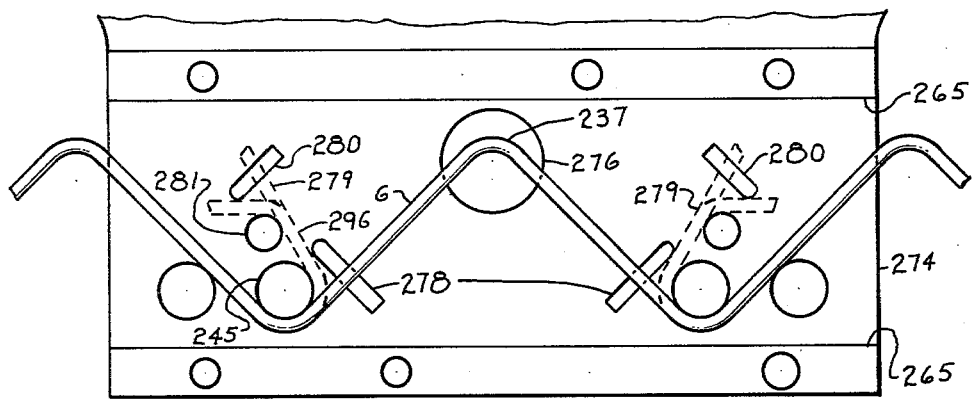
FIG. 40
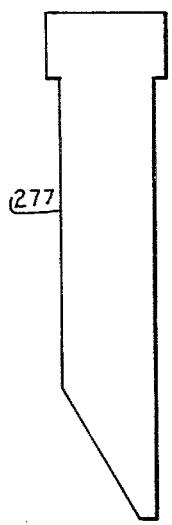
FIG. 41    FIG. 42
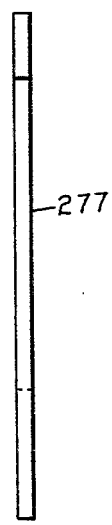
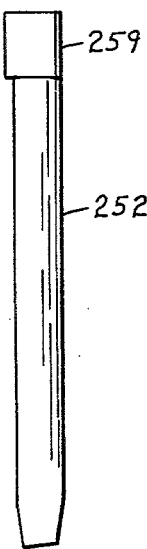
FIG. 43
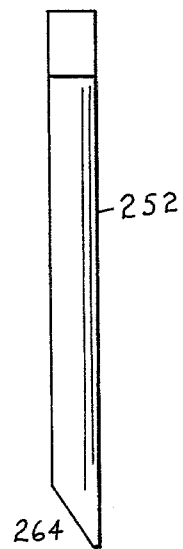
FIG. 44
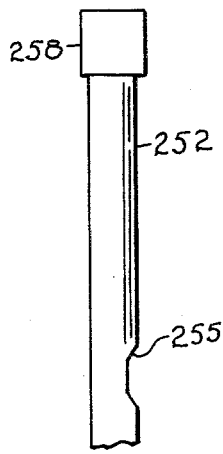
FIG. 45
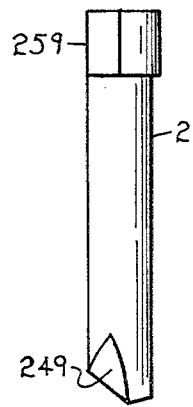
FIG. 46
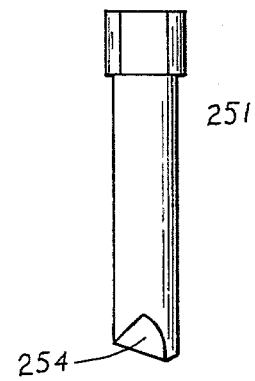
FIG. 47
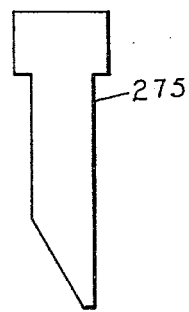
FIG. 48
*John Wesley Hughes*
INVENTOR United States Patent Office 3,180,371
Patented Apr. 27, 1965

3,180,371
ZIG-ZAG SPRING MACHINE
John Wesley Hughes, Rte. 1, Box 82, Jamestown, N.C.
Filed Mar. 12, 1962, Ser. No. 178,853
5 Claims. (Cl. 140—102)

This invention relates to a machine for forming sinuous springs. The machine automatically forms a sinuous spring whose elements are at a skew and whose end elements are properly bent to hook into the standard types of clips. Also, this machine will cut and form ends at any bend in the spring, permitting a close control of the spring length.

The sinuous spring forming machines that are in large scale use at the present time form springs whose elements run substantially perpendicular to the main length of the spring. This invention, in making springs whose elements are at a skew, uses considerably less length of wire to make substantially the equivalent spring. Further, in using less length of wire to make the equivalent spring, a lighter gauge of wire must be used to preserve the same "give" in the spring. The net effect, due to the smaller length and gauge of wire, is that approximately half the weight of wire is needed to form an equivalent spring. Therein lies the main attractiveness of this machine, because the cost of the wire, which is the main cost in this general type of spring, is greatly reduced.

The main difficulty in a spring with substantially skew elements is that there is no length of wire that can be satisfactorily held by a standard clip. The present invention reforms the end elements perpendicular to the main axis of the spring as it cuts the spring to length, thus overcoming this difficulty. While reforming the ends is complicated, it is compensated for by the relative ease with which the main body of the skew element spring can be formed.

The features that permit the machine to cut off the spring at any bend are obtained by the use of several double-duty punchlike cams in the die set and a spring positioning and feed mechanism that functions in two dimensions while it simultaneously arches the spring.

This machine, having simple rotary parts to form the main body of the spring and a punch press to cut and reform the ends, will easily function at a high speed.

Figure 23:
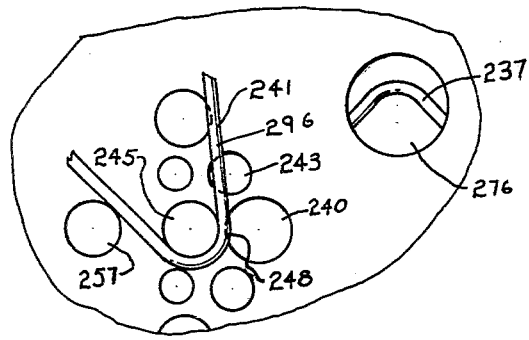
Figure 25:
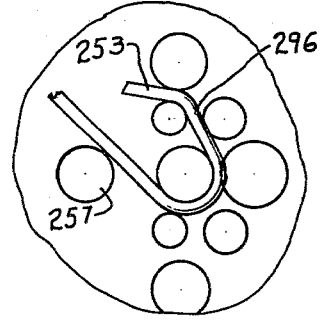
Figure 24:
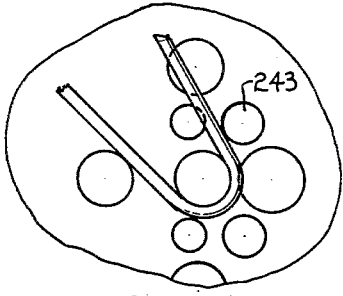
Figure 26:
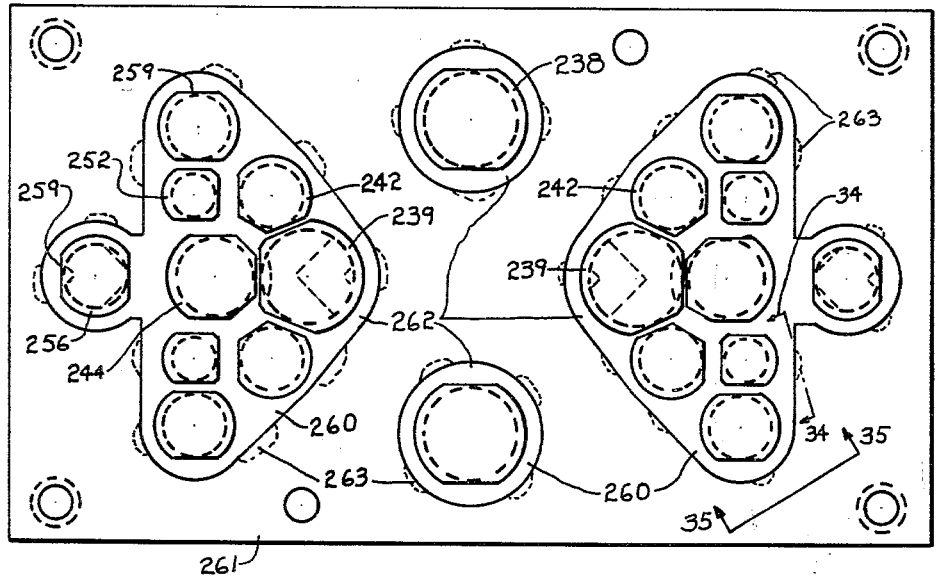
Figures 27, 28, 29, 30:
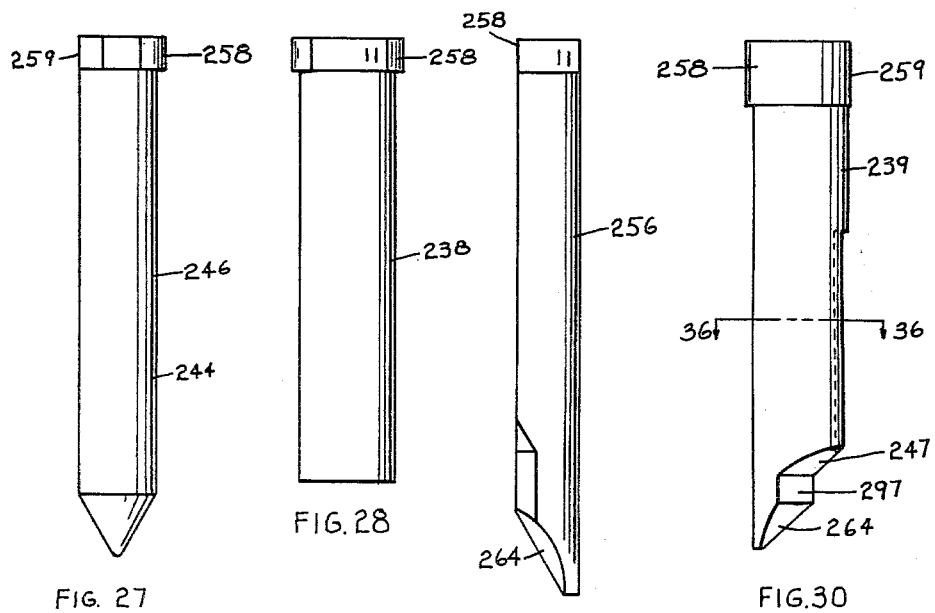
Figure 36:
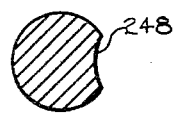
Figure 31:
Figure 32:
Figure 33:
Figure 34:
Figure 35:
Figure 37:
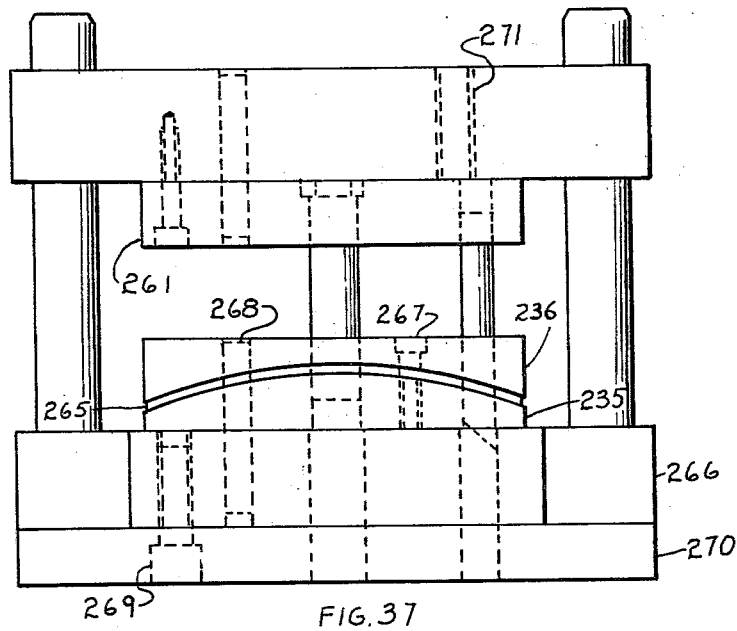

Referring to the accompanying drawings:
FIGURE 1 is a front view of the entire machine;
FIGURE 2 is a front cut away view of the forming mechanism;
FIGURE 3 is a back view of the forming mechanism gears;
FIGURE 4 is a top view of the forming mechanism;
FIGURE 5 is a detail section along line 5—5 of FIGURE 2 showing forming pins and the adjustment details;
FIGURE 6 is a detail section along line 6—6 of FIGURE 4 showing the forming mechanism phase adjustment;
FIGURE 7 is an internal top view of the cam and clutch shafts;
FIGURE 8 is a detail view of the primary clutch shaft and associated parts;
FIGURE 9 is a detail view of the secondary clutch shaft and associated parts;
FIGURE 10 is a detail view showing how the clutch is released;
FIGURE 11 is a cam layout diagram;
FIGURE 12 is a front cut away view of the arching mechanism;
FIGURE 13 is a plan view of the arching wheel;
FIGURE 14 is a developed view of the arching wheel;
FIGURE 15 is a developed view of an alternate arching wheel;
FIGURE 16 is a right side cut away view of the archer shaft and pillow blocks; the central sectioned portion is a section along line 16—16 of FIGURE 12;
FIGURE 17 is an internal left side view of the joggler mechanism and the positioner;
FIGURE 18 is a front view of the joggler mechanism;
FIGURE 19 is a top detail of the adjustable throw crank;
FIGURE 20 is a front view of the positioner;
FIGURE 21 is a top view of the punch press drive;
FIGURE 22 is a top view of the die plate with a section of spring on it ready to be cut and reformed;
FIGURES 23–25 show the end element of the spring cut and progressively formed;
FIGURE 26 shows the positioning of the punchlike parts and how they are secured;
FIGURE 27 shows the wrapping punch;
FIGURE 28 shows the severing punch;
FIGURE 29 shows the holding punch;
FIGURE 30 shows a main punchlike cam;
FIGURE 31 shows a right hand primary hooking punchlike cam;
FIGURE 32 shows a right hand secondary hooking punchlike cam;
FIGURE 33 shows a right hand internal hooking punchlike cam;
FIGURE 34 shows a right hand internal hooking punchlike cam viewed from direction 34—34 of FIGURE 26;
FIGURE 35 shows a right hand internal hooking punchlike cam viewed from direction 35—35 of FIGURE 26;
FIGURE 36 is a section on line 36—36 of FIGURE 30;
FIGURE 37 shows the assembly of the die set with some of the parts omitted.
FIGURE 38 shows a completed spring with the reformed ends pointing in the same direction;
FIGURE 39 shows a completed spring with the reformed ends pointing in opposite directions;
FIGURE 40 shows an alternate form of the die plate for an alternate die set;
FIGURE 41 shows a front view of a punchlike cam for the alternate die set;
FIGURE 42 shows the end view of this cam;
FIGURES 43–45 are views of a left hand internal hooking punchlike cam corresponding to FIGURES 33–35 for the opposite hand part;
FIGURE 46 is a front view of a left hand primary hooking punchlike cam;
FIGURE 47 is a front view of a left hand secondary hooking punchlike cam;
FIGURE 48 is a front view of a small punchlike cam for the alternate die set.

Referring to FIGURE 1, the machine operates from an overall standpoint as follows. The spring wire 1 unwinds from the wire coil 2 which is situated in the wire reel 3. The wire 1 then passes through the wire straightener 4 which straightens the wire 1. The wire 1 then passes through the forming section 5 of the machine where it is formed. After it is formed the wire 1 is changed into a continuous spring 6. This spring 6 passes in a large loop 7 to the arching mechanism 117. The arching mechanism 117 arches the spring 6 and forces a predetermined length through the die set 9. The punch press 10 closes the die set 9, severs the spring 6, and reforms its ends. The machine operator removes the completed spring 11, and the cycle automatically repeats. The motive power is derived from an electric motor 12 which is bolted by bolts 13 to a floor plate 14. The floor plate 14 is itself bolted by more bolts 13 to the frame 15, which is made of angle iron and bolted together.

FIGURE 2 contains more details of the forming section 5. The V-belt 16 takes power from the motor 12 by way of a small V-pulley, not shown, which is attached to the motor's shaft. The V-belt 16 is attached on its opposite end to a large V-pulley 17 which is supported by a shaft 18 which is in turn supported by pillow blocks 19 which are bolted to the frame 15. A small sprocket, not shown, is attached to the shaft 18. The small sprocket drives a large sprocket 20 through a chain 21. The large sprocket 20 rotates a shaft 22 which journals in pillow blocks 23. The shaft 22 drives a small sprocket 234, not shown, which pulls the chain 24 which drives the large sprocket 25 which is keyed to a shaft 26 which is carried in pillow block 27 and pillow block 28 shown in FIGURE 3. The shaft 26 is keyed to a gear 29 which drives gear 30 through two idler gears 31. The idler gears 31 are rotatably mounted on shafts 34 which are affixed into a block 32. FIGURE 4 shows a set collar 33 which retains the idler gears 31. The block 32 is bolted to the back mounting plate 282. The back mounting plate 282 is bolted to a bar 35 which is in turn bolted to the frame 15. The front mounting plate 36 is similarly attached to the frame 15 through bar 37. The front and back mounting plates 36 and 282 are similarly attached to frame cross member 301 by lower bars 302. The bars 35 and 37 have tapped holes 38 at their centers to adjust up and down by means of set screws 283 the pillow blocks 39 and 40 which carry the shaft 41. The front mounting plate 36 and the back mounting plate 282 have slots 300 milled in them to allow the pillow blocks 39 and 40 and block 32 to be adjusted; there are also similar slots, not shown, to allow shaft 41 to be moved up and down. The gear 30 drives shaft 41 through a phase angle adjuster 42. As shown in FIGURE 6 two set screws 43 bear against dowel pin 44 which is press fitted into gear 30, thus allowing the angle of shaft 41 to be varied independently of shaft 26. The phase angle adjuster is keyed to shaft 41.

The shaft 26 has a wheel 45 keyed to it. The shaft 41 also has a wheel 46 keyed to it. These wheels 45 and 46 have six forming pins 47 apiece, which protrude inwardly towards each other and are equally spaced. The wheels 45 and 46 are thus set facing each other with a small space 299 between for the forming pins 47; this is best seen in FIGURE 4. Also the axes of the wheels 45 and 46 are set apart, being set on different shafts, 26 and 41; this is best seen in FIGURE 2. The motor 12 rotates clockwise, as seen from FIGURE 1, driving the large V-pulley 17 clockwise; in turn the largest sprocket 20 rotates clockwise, as does the large sprocket 25, forcing the wheel 45 to do the same. The wheel 46, however, rotates counterclockwise due to the fact that it is driven through the two idler gears 31.

The wire 1 on leaving the wire straightener 4 passes through a guide 48 that leaves it free to move up and down but restricts its sideways motion. The wire 1 then passes between the wheels 45 and 46 where it is bent by forming pins 47 so that each element 49 of the spring 6 is permanently set in a skew direction with reference to the main axis 284 of the spring. (See FIGURE 38.) The foregoing is also clearly shown in FIGURE 2 which has been cut away revealing the spring 6 as it is formed. The forming pins 47 on the lower wheel 45, which is partially cut away, are shown in section. As an aid to visualization, this process for forming skew element springs is similar to running a piece of paper between two gears in mesh. Each forming pin 47, when it contacts the wire 1, forms a bend 287.

FIGURE 5 shows in detail how the forming pins 47 are secured to the wheels 45 and 46. A slot 50 is milled through the wheel 46. The slot 50 is wide enough to pass the shank 51 of the pin 47. The pin 47 is threaded on its far end and secured by a nut 52. The pin is further held between an adjustment block 53 and a set screw 54. The head of the pin 47 is held by a washer 55 that is set in an extension 56 of the slot 50. On the head of the pin 47 there is a groove 57 to fit the form of the wire 1.

Shaft 26 protrudes past the frame 15 where it carries two sprockets; the nearer sprocket 58 is connected by chain 59, as shown in FIGURE 4, to another sprocket 60, shown in FIGURE 7. FIGURE 7 shows the clutch indicated generally as 285. Sprocket 60 is keyed to the primary clutch shaft 61. A timing take off sprocket 62 is connected to a timing shaft sprocket 64 by chain 63. Timing shaft sprocket 64 drives the timing shaft 65 which is journaled by pillow blocks 110. The primary clutch shaft 61 is journaled by pillow blocks 66 which are bolted to the frame 15 and a cross member 67. The secondary clutch shaft 68 has a male extension 69 which is received into a female bore 70 with a brass sleeve 71 in the primary clutch shaft 61, as shown in FIGURES 8, 9, and 10. Near the opposite end the secondary clutch shaft 68 is journaled in pillow block 72.

The dog driver 73 is keyed to the primary clutch shaft 61. The dog driver is bored 74 and fitted with a brass sleeve 75 to journal the dog shaft 76, to which is affixed the dog 77 by a dowel 78. The dog shaft is retained by a cotter key 79. To a hook 80 is attached a spring 81 whose far end is attached to a pin 82. The spring 81 rides in a groove 83 which is shown in FIGURE 8, where the spring 81 is not shown. The secondary clutch shaft 68 has a collar 84 silver soldered to it. The collar 84 has a spring retaining pin 85 silver soldered into a hole 86. The spring retaining pin 85 prevents the clutch spring 87 from unwinding. A collar 88, restrained by a key 91 on the secondary clutch shaft 68, holds the other end of the clutch spring 87 where the tang 89 passes through a hole 90. Timing shaft 65 in rotating turns the clutch cam 92 which lifts the following end 99 of the clutch rocker 93 through an antifriction cam follower 94 which is held on a pin 95 which is retained by cotter keys 96. This is general practice on this machine for holding cam followers. The clutch rocker 93 is pivoted at its approximate center on a pin 97 which is retained by cotter keys on a double hinge 98 which is secured to the frame 15. As the clutch rocker 93 is being driven up by the clutch cam 92 at its following end 99, it is descending at its working end 100 for the purpose of releasing the dog 77 from engagement with the protruding lip 101 of the clutch spring 87. The dog 77 is normally in a position to engage the protruding lip 101 due to the influence of spring 81. The roller bearing 102 is the part that actually depresses the rear end 103 of the dog 77 so that the opposite end will be pivoted off the protruding lip 101 (shown in the phantom in FIGURE 10) of the clutch spring 87. In FIGURE 11 line 104 is a development of the clutch cam 92. Since the primary clutch shaft 61 makes a full revolution while the timing shaft 65 makes a quarter revolution, the dog 77 will pass unmolested under the roller bearing 102 for two consecutive revolutions, as indicated at 105 and 106, the following end 99 being down and the working end 100 being up. However, at positions 107 and 108 the following end 99 is up and the working end 100 down, making the dog 77 pass over the protruding lip 101 of the clutch spring 87. During these two revolutions of the primary clutch shaft 61 the secondary clutch shaft 68 will remain stationary due to the influence of a frictional drag 109 (shown in section) that is secured to the frame 15. The drag 109 slips during the two revolutions indicated at 105 and 106 when the dog 77 drives the clutch spring 87, the collar 88, and the secondary clutch shaft 68. The purpose of the clutch spring 87 is to take up the shock of engagement of the clutch mechanism so that the rest of the machine will not be put under unnecessary strain.

The clutch 285 and associated timing mechanism just described takes the continuous motion supplied from the motor 12 and converts it into a timed intermittent motion suitable for driving and positioning the spring 6 preparatory to severing it. Then there is a pause while the spring 6 is severed and removed from the machine.

FIGURE 12 shows the spring arching mechanism, indicated generally as 117; the support 111, a brace 112 for the support 111, and the babbited bearing 113 have been cut away to show details. The spring arching mechanism 117 besides giving an arch to the spring forces the correct amount of spring 6 through die set 9 and correctly positions the spring in the die set, aided by other machine components, of course. The spring arching mechanism 117 derives its power from the output of the clutch 285 so that it is actually, considered together with the clutch 285, a timed intermittent spring feed. The arching wheel 114 is made to follow the arching shaft 115 by a set screw 116. The arching wheel 114 has six cogs 118, tapered and half cut away at their tops 145, set in it and secured by set screws 119. The six minor cogs 120, tapered at their tops, are held by set screws 119 also. FIGURE 14 shows how the spring 6 lies in between the cogs 118 and minor cogs 120. The cogs 118 and minor cogs 120 function to pull the spring 6 around the arching wheel 114 and force it through the die set 9 to be reformed and cut off.

The spring 6 enters the arching mechanism 117 at the end 122 of the incoming spring guide 123. The spring 6 passes into a chute formed by a milled slot 124 and a cap 125 secured to the incoming spring guide 123 by screws. The spring 6 proceeds along the milled slot 124 to where 127 it is picked up by the cogs 118 (the spring 6 is shown in section at 127 to show it being picked up) and minor cogs 120 at which point the incoming spring guide 123 has slots 128 to allow passage of the cogs 118 and minor cogs 120. The shape of these slots 128 is best seen in FIGURE 16 where identical slots 129 are shown in section in the outgoing spring guide 130. The arching wheel 114 is adjoined on both sides by bearing blocks 131 with brass inserts 132. The bearing blocks 131 are held in place by set screws 133 in the posts 134. The posts 134 are tapped 138 and bolted to the archer base 135 and to the lintels 136. A cross member 137 separates the lintels. The posts 134 are drilled 139, as are the incoming spring guide 123 and the outgoing spring guide 130, and a cotter keyed pin 140 hinges the spring guides 123 and 130 from the posts 134 allowing the spring guides 123 and 130 to swing away from the arching wheel 114 for threading the spring 6 and also to adjust to a degree the amount of arch or set impressed on the spring 6.

A cam follower type roller bearing 141 is secured to the archer base 135. The roller bearing 141 can freely travel in a direction in or out of the page with reference to FIGURE 12, laterally with respect to the spring (the direction hereafter described as lateral) but prevents the arching mechanism 117 as a whole from rotating but allowing it to move laterally. The arching mechanism 117 is further unrestrained as to lateral movement by the babbited bearing 113 which holds the arching shaft 115. These are babbited bearings so that the arching shaft 115 can rotate as shown by arrow 143 and move laterally as shown by double headed arrow 144. The roller bearing 141 works in a slide 146 bolted to the frame 15.

The spring guides 123 and 130 are adjustably retained in position by screws 147, that are threaded through latches 148 that are screwed to supports 149 by screws 150. The supports 149 are screwed to the archer base 135 and the pillar braces 151, which are also screwed to the archer base 135. The babbited bearings 113 are bolted to the supports 111 by bolts 152. Supported near the arching wheel 114 by a thumb screw 153 and a lock nut 154 is the former 155, which has a similar section to the outgoing spring guide 130, as shown in FIGURE 16. Screwed to the outgoing spring guide 130 is a dog leg guide 156 which guides the spring up near the die set 9. On the opposite side of the die set 9 is another short guide 157 that is open on its top side so that the machine operator may easily slide the completed spring 11 free. Sheet metal guide 159 prevents the spring 6 and the completed spring 11 from tangling. The short guide 157 is held by an arm 160 by screws 309. The arm 160 is bolted to an extension 286 which is screwed to a post 134 and the archer base 135.

If desired the arching wheel 114 can be made so that an odd number of elements 49 would constitute a complete revolution of the arching wheel 114. In this case the arching wheel should be laid out as in FIGURE 15 to properly pull the spring 6.

The arching mechanism 117 is moved laterally by the joggler mechanism, indicated generally as 161. See FIGURE 17. Two taper pins 163 pin collars 162 to the arching shaft 115. The driving collar 164 is mounted between two brass bearing collars 165 so as to allow the arching shaft 115 to turn. The driving collar 164 is made to move laterally by pins 166 secured by set screws 167 in the bellcrank 169. The pins 166 are slightly smaller than their corresponding holes 168 so that the slight misalignment caused by the oscillations of the bellcrank 169 is compensated for. The bellcrank 169 is composed of two parts, the yoke 170 and the arm 171 welded together. The arm 171 has a sleeve bearing 172 to allow the bellcrank 169 to pivot on the shaft 173 which is secured to standards 174 by a set screw 175. The standards 174 are bolted to the frame 15. The arm 171 is tapped to receive a bolt 176 which secures the ball of a ball joint 177. A similar ball joint 178 is connected to an adjustable throw crank 179. Both ball joints 177 and 178 are connected by a stud 180 and locked by lock nuts 181. The adjustable throw crank 179 has a throw plate 182 that can be adjusted so that the crank bolt 183 is the proper distance from the center of the joggler shaft 184. The throw plate is bolted through adjustable slots 185 onto the flange 186 by socket head bolts 187. The flange 186 is secured to the joggler shaft 184 by a key 188 and set screw 189. The joggler shaft 184 is journaled in pillow blocks 190 which are secured to the frame 15 by inverted standards 191 and bolts 192. On the far end of the joggler shaft 184 is a sixty-tooth sprocket 192 which is connected by chain 194 to a fifteen-tooth sprocket 193 (FIGURE 7) near the end of the secondary clutch shaft 68. The arching shaft 115 is likewise connected by chain 195 and sprocket 213 to a sprocket 196 on the end of the secondary clutch shaft 68.

In FIGURE 20 the operation of the positioner 197 is most clearly seen. The positioner cam 198 lifts the rocker arm 199 which pivots in the double hinge 98. Line 295 in FIGURE 11 represents the lift of the positioner cam 198. The rocker arm 199 lifts the double lift bar 200 through a pin 201 retained by cotter keys. The double lift bar is made in two parts, lower 202 and upper 203, which telescope in the center and are clamped by bolts through slots 204 so as to adjust to the correct length. The upper 203 part hooks by hinge pin 205 to the T 206 which swings from bracket 207 by a bracket pin 208 and is retained by a collar 209. The upper end of the T 206 has a roller bearing 210 between its two side plates 211. The star 288 receives the roller bearing 210 and rotates the arching shaft 115 until the roller bearing 210 rolls into a low place on the star 288. The star 288 can be adjusted on the arching shaft 115 so that it brings the arching mechanism 117 into a position so that the die set 9 will work on a proper section of spring 6; then the star 288 is bolted against a collar 212 that is keyed to the arching shaft 115. The heads of the bolts are secured by a plate with holes 289. The sprocket 213 may be keyed directly to the arching shaft 115 as shown in FIGURE 17 or it may be alternately secured in the same manner as the star 288 so that it may be adjusted.

FIGURE 21 shows how the shaft 22 drives the punch press 10. On the end of shaft 22 is a sprocket 214 which drives chain 215 which drives sprocket 216 which drives shaft 217. Shaft 217 is journaled in pillow blocks 218 which are bolted to a plate 219 which is in turn bolted to the punch press 10. Shaft 217 has on it a miter gear 220 which meshes with another miter gear 221 (through a hole 303 in plate 219) which is affixed to a shaft 222 which is journaled in pillow blocks 223 which are bolted onto a back plate 224 through standards 225. The back plate 224 is screwed to plates 219 and 226. A sprocket 227 on the shaft 222 drives the chain 228 that turns the sprocket 229 on the punch press fly wheel 230.

For the two consecutive revolutions that the secondary clutch shaft 68 turns, because the sprockets 193 and 192 are in a one to four ratio, the joggler shaft 184 turns only one-half of a revolution. This means that if the adjustable throw crank 179 was up in one idle period it would be down in the next. And this means that the arching shaft 115 and the various devices secured to it would alternately move to the right and to the left, with reference to FIGURE 17, that is, laterally, due to the action of the bellcrank 169. This action will produce the type of spring shown in FIGURE 39, with ends pointing in opposite directions. On the other hand, if the chain 194 is removed so that the joggler shaft 184 does not rotate and the adjustable throw crank 179 is left in either the upward or downward position the machine will produce the type of spring shown in FIGURE 38 with the ends pointing in the same direction.

For the two consecutive revolutions that the secondary clutch shaft 68 turns, the sprocket 196 drives sprocket 213 through a chain 195 thereby turning the arching shaft 115 and thereby forcing spring 6 through the die set 9. During the two revolutions of the primary clutch shaft 61 that the secondary clutch shaft 68 lies still, the trip cam 231 activates the trip lever 232 causing the trip rod 233 to descend and single trip the punch press 10, causing the die set 9 to close and open, thereby completing a spring 11. The trip lever 232 is shown broken away in FIGURE 7 to reveal the trip cam 231. The part of the trip lever over the trip cam 231 carries a roller bearing cam follower in the same way as does the clutch rocker 93. The opposite end of the trip lever 232 has a hole 291 drilled in it to receive the trip rod 233. The trip rod 233 is threaded 290 on its lower end so that nuts 292 can secure it to the trip lever 232. The punch press 10 is caused to trip right after the secondary clutch shaft 68 stops as shown by 293 in FIGURE 11, line 294 representing the layout of the trip cam 231. In this manner the punch press is timed.

FIGURE 11 should be read from left to right, and the lines 308 indicate 90-degree intervals in the machine cycle.

In order to synchronize the entire machine, one section with another, the following number of teeth on the gears and sprockets are used:

| Gear #: | No. of teeth |
| --- | --- |
| 29 | 28 |
| 30 | 28 |
| 31 | 18 |
| 220 | 25 |
| 221 | 25 |
| Sprocket #: | |
| 234 | 12 |
| 25 | 48 |
| 58 | 24 |
| 214 | 48 |
| 60 | 2x |
| 193 | 15 |
| 196 | 2x |
| 192 | 60 |
| 213 | 24 |
| 216 | 2x |
| 227 | 18 |
| 229 | 36 |
| 62 | 15 |
| 64 | 60 |

$2x$ means twice the number of elements 49, including the end elements 296, that is desired in a completed spring 11. To change the number of elements in a completed spring 11 it is necessary to change the three sprockets 60, 196, and 216.

The positioner cam 198 and the trip cam 231 are both adjustably secured to the timing shaft 65 in the same manner as the star 288 is secured to the arching shaft 115. To adjust the clutch cam 92 the chain 63 is slipped. Thus each of these cams can be adjusted independently to time the machine. The return spring 304 for the positioner cam 198 is attached to the T 206 and the frame 15. The return spring 305 for the trip cam 231 is attached between the trip lever 232 and the frame 15. The return spring 306 for the clutch cam 92 is attached between the clutch rocker 93 and the frame 15.

FIGURE 22 shows the die plate 235 with the stripper plate 236 and shims 265 removed and the spring 6 in position to be severed and have its end elements 296 reformed as the die set 9 closes. FIGURE 23 shows the left top side of FIGURE 22 after the slug of wire 237 has been punched by severing punch 238 and a main punchlike cam 239 which descends into hole 240 has reformed the end element 296 of the spring to a position 241, where a primary hooking punchlike cam 242 which descends into hole 243 can further reform it. The main punchlike cam has a waiting area 297 that does no work while the spring 6 is severed.

The main punchlike cam 239 bends the end element 296 to position 241 in conjunction with wrapping punch 244 which descends into hole 245. The spring 6 bends around the main body 246 of the wrapping punch 244 because the final taper 247, wherein the main punchlike cam 239 changes to a conforming section 248 as shown in FIGURE 37, forces it to.

The primary hooking punchlike cam 242 then forces the end element 296 over further as shown in FIGURE 24; the forcing is done by taper 249 as it descends into hole 253. It should be noted, as shown in FIGURES 22, 24, and 25, that the end elements 296 are bent past the desired perpendicular position; however, when the die set 9 opens back up the end elements 296 will spring back to the correct position as shown in FIGURES 38 and 39. Also, in reforming the end elements 296 it is not necessary that they be exactly perpendicular to the main axis of the spring 284 because the user of the spring will be able to secure the end elements 296 even if they are "off" to a small extent. The end elements 296 in being reformed are kept in the same approximate plane as the rest of the elements 49. Finally the secondary hooking punchlike cam 251 and the internal hooking punchlike cam 252 working from opposite sides of the end element 296 complete the hook 253 which is on the extremity of the end element 296 by the action of their respective tapers 254 and 255. While these various bending actions are taking place, the spring 6 is being held by holding punch 256 that descends into hole 257. The reason that the end element 296 of the spring can pass through the positions that are finally occupied by the primary hooking punchlike cam and the secondary hooking punchlike cam is because these punchlike cams are relatively short.

The heads 258 of the various punches and punchlike cams are flatted 259 to prevent their turning and to facilitate their fitting close together as shown in FIGURE 26. A thermal punch setting alloy 260 is used to set the punchlike cams and punches in the punch plate 261, which is made with conforming cavities 262 which have undercuts 263 to prevent any movement of the punches or punchlike cams relative to the punch plate 261. The lower portions of punchlike cams 239 and 252, holding punches 256 and wrapping punches 244 are tapered 264 to bring the spring 6 into a position as shown in FIGURE 22 (full line) or to an opposite position 298. The die set is doubly symmetrical so as to cut and reform the spring 6 on either side and properly form both ends on a single stroke of the punch press. Thus the die set 9 can sever and reform the ends of the spring 6 if the spring is on the back side of the die set 9 as shown in FIGURE 22 as a solid spring, or it can similarly sever and reform the ends of the spring when it is in the opposite position 298 on the front side of the die set 9. The part of the spring nearer the front side of the die set is the front side of the spring, and the part nearer the back side of the die set is the back side of the spring.

FIGURE 37 shows how the stripper plate 236 is separated from the die plate by a shim 265 and the whole secured to the die shoe 266 by socket head cap screws 267 and dowels 268. The punch plate 261 is similarly secured to the top of the die set 9. One socket head bolt 269 is illustrated holding the die shoe 266 to the bolster 270 and one tap 271 for securing the upper half of the die set 9 to the punch press ram 272. FIGURE 37 also shows how holes 273 are cut through the die shoe 266 and bolster 270 to allow the punches and punchlike cams to descend. Not all of the punchlike components, holes, dowels, pins, and other necessary parts are shown in FIGURE 37; to do so would merely create a confusion of lines while showing only standard die making practice. FIGURE 1 and some of the other drawings are similar; where the machine hews to standard practice it is not necessary to dwell. On the other hand, the placement and shape of the punchlike components is crucial to the success of the machine so that many details of construction are shown.

FIGURE 40 shows the die plate 274 of an alternate die set that does less and is simpler than the earlier described die set 9. Where the pieces are identical to the earlier described die set, the same numbers will be used for the parts. The difference is that it has less punch-type elements and will cut and reform the spring only on one side, so that the entire joggling mechanism 161 can be dispensed with. A spring severing punch 238 punches out the slug of wire 237 into hole 276. Punchlike cams 277 then descend into slots 278 to force the end element 296 of the spring into positions 279 around the wrapping punches 244 which have already descended into holes 245. Next small punchlike cams 275 descend into slots 280 and form hooks on the extremities of the end elements 296 by forcing them around small wrapping punches not shown which have descended into holes 281. The rest of the construction of this die set is similar to the preceding one.

On the machine there are also auxilliary spring guides 307, whose purpose is to guide the spring 6 into its loop 7 so as not to interfere with any parts of the machine.

It should be noted that it is possible to combine the functions of two or more of the various punchlike cams into a single part by placing several camming surfaces on a single punchlike cam of appropriate shape. In the two die sets illustrated the necessary camming surfaces are placed where possible on separate punchlike parts for ease of construction, strength of the die set, and ease of maintenance.

For certain types of springs it would be desirable to reform just one end of the spring as shown; the other end could then be reformed as desired in a separate operation or possibly in the same die set. The present machine can easily be modified to make such a spring. The appropriate punchlike cams could be taken out of the die set or a die set could be constructed with only the necessary parts.

I claim:

1. A die set to sever and reform the end elements of skew element sinuous spring, the die set including the following parts to perform the functions specified in the sequence that the parts are named, a punch for severing the spring, a punchlike cam to reform a spring end element, giving said spring end element a permanent set perpendicular to the main axis of the spring and in the plane of the spring, and a punchlike cam to form a hook on the extremity of said end element of the spring.

2. A die set to operate on a continuous strip of skew element sinuous spring for severing and reforming the ends of said spring, the die set including the following parts to perform the functions specified in the sequence that the parts are named a punch for severing the spring, punchlike cams to reform the spring end elements, giving said spring end elements a permanent set perpendicular to the main axis of the spring and in the plane of the spring, and punchlike cams to form hooks on the extremities of said end elements of the spring.

3. A die set to operate on a continuous strip of skew element sinuous spring for severing and rebending the ends of said spring, including in combination a punch for first severing the spring, punchlike cams to subsequently rebend the main bodies of the spring end elements past the perpendicular to the main axis of the spring so that the end elements will be left with a set perpendicular to the main axis of the spring, wrapping punches to cooperate with said punchlike cams in the rebending, and, last to come into operation, shorter punchlike cams of a length so that the end elements may pass under said shorter punchlike cams while the end elements are being rebent, said shorter punchlike cams being so positioned that they bend hooks on the extremities of the end elements while said end elements are in the aforementioned past-the-perpendicular position.

4. In a machine for severing and reforming the ends of a continuous strip of skew element sinuous spring, the combination of a laterally oscillating feed mechanism and a die set, the laterally oscillating feed mechanism consisting of: a wheel with a plurality of cogs suitable for driving said sinuous spring through said die set, means for rotating said wheel, and means for oscillating said wheel alternately towards the back side and front side of said die set; the die set consisting of: two punches, one in the front side of said die set and one in the back side of the die set, the front punch for severing said spring on its front side, when said wheel is towards the front of the die set, the back punch for severing said spring on its back side, when said wheel is toward the back of the die set, a plurality of long punchlike cams for reforming the end elements of said spring perpendicular to the axis of said spring, and a plurality of short punchlike cams to allow the end elements of said spring to pass under in reforming and then, after the end elements are reformed perpendicularly form a hook on the extremities of said end elements.

5. In a machine for severing and reforming the ends of a continuous strip of skew element sinuous spring, the combination of a spring feed and guide mechanism and die set, the spring feed and guide mechanism consisting of: means for feeding a predetermined length of said sinuous spring through said die set and guiding means to channel said sinuous spring alternately near to the front and back sides of said die set, the die set consisting of: a front punch for severing the front side of said sinuous spring when said sinuous spring is near the front side of the die set, and a back punch for severing the back of the spring when the spring is near the back of the die set, a plurality of long punchlike cams for reforming the end elements perpendicular to the axis of said sinuous spring, and a plurality of short punchlike cams to allow the end elements of said sinuous spring to pass under said short punchlike cams in reforming and then, after the end elements are reformed perpendicularly to form a hook on the extremities of said end elements.

References Cited by the Examiner

UNITED STATES PATENTS

| | | | |
|---|---|---|---|
| 2,047,717 | 7/36 | Dresser et al. | 140—71 |
| 2,188,407 | 1/40 | Horton | 140—90 |
| 2,645,252 | 7/53 | Norman. | |

CHARLES W. LANHAM, Primary Examiner.

RICHARD A. WAHL, Examiner.